United States Patent
Entenmann et al.

[11] Patent Number: 5,243,942
[45] Date of Patent: Sep. 14, 1993

[54] PROCESS FOR CONTROLLING KNOCKING IN INTERNAL COMBUSTION ENGINES

[75] Inventors: Robert Entenmann, Benningen; Stefan Unland, Schwieberdingen; Werner Haeming, Neudenau-Herbolzheim, all of Fed. Rep. of Germany

[73] Assignee: Robert Bosch GmbH, Stuttgart, Fed. Rep. of Germany

[21] Appl. No.: 860,517
[22] PCT Filed: Feb. 28, 1991
[86] PCT No.: PCT/DE91/00170
§ 371 Date: Jun. 11, 1992
§ 102(e) Date: Jun. 11, 1992
[87] PCT Pub. No.: WO91/14097
PCT Pub. Date: Sep. 19, 1991

[30] Foreign Application Priority Data

Mar. 15, 1990 [DE] Fed. Rep. of Germany ....... 4008170

[51] Int. Cl.$^5$ ............................................. F02P 5/15
[52] U.S. Cl. ............................................................ 123/425
[58] Field of Search .......................... 123/425, 435; 364/431.08

[56] References Cited

U.S. PATENT DOCUMENTS

| 4,382,429 | 5/1983 | Enoshima et al. | 123/425 |
| 4,512,309 | 4/1985 | Tansuwan | 123/425 |
| 4,527,524 | 7/1985 | Guipaud | 123/425 |
| 4,527,526 | 7/1985 | Akasu | 123/425 |
| 4,539,957 | 9/1985 | Haraguchi et al. | 123/425 |
| 4,541,382 | 9/1985 | Hosoe et al. | 123/425 |
| 4,582,034 | 4/1986 | Iwata | 123/425 |
| 4,631,680 | 12/1986 | Korb et al. | 123/425 X |
| 4,774,922 | 10/1988 | Morita | 123/425 |
| 5,000,150 | 3/1991 | Miyama et al. | 123/425 |

FOREIGN PATENT DOCUMENTS

| 0084368 | 7/1983 | European Pat. Off. . |
| 087162 | 8/1983 | European Pat. Off. . |
| 0193896 | 9/1986 | European Pat. Off. . |
| 0326193 | 8/1989 | European Pat. Off. . |
| 3009046 | 9/1981 | Fed. Rep. of Germany . |

OTHER PUBLICATIONS

Patent Abstracts of Japan, vol. 8, No. 146, (M-307) (1583), Jul. 7, 1984.

*Primary Examiner*—Tony M. Argenbright
*Attorney, Agent, or Firm*—Michael J. Striker

[57] ABSTRACT

A process for controlling knocking of an internal combustion engine comprises the steps of retarding an ignition angle when a cylinder knocks, resetting the ignition angle by adjusting in the direction of "advance", storing prevailing ignition angle retardation values in an adaptation characteristic diagram which, depending on a size of operating parameters of the internal combustion engine, has subdivided ranges, with one value of an ignition angle retardation determined during operation in an appropriate range and particularly on leaving this range, always being stored, setting the value of the ignition angle retardation as stored for a particular range on changing into this range, and on changing the range, resetting the ignition angle with increased advance adjustment speed until knocking occurs in this range or until a predetermined value of the ignition angle is reached.

20 Claims, 3 Drawing Sheets

PROCESS FOR CONTROLLING KNOCKING IN INTERNAL COMBUSTION ENGINES

BACKGROUND OF THE INVENTION

The present invention relates generally to a process for controlling the knocking in an internal combustion engine.

More particularly it relates to such a process for controlling the knocking in an internal combustion engines which includes retarding the ignition angle when a cylinder knocks, resetting the ignition angle, by adjustment, in the direction of "advance", storage of current ignition angle retarding values in an adaptation characteristic diagram which, depending on the value of operating parameters of the internal combustion engine, has subdivided areas, with one value of an ignition retardation, determined during operation in the relevant range, always being stored (this takes place in particular on leaving this range), setting of the ignition retardation angle, stored for a particular range, on changing into this range.

When an internal combustion engine is operated, the so-called knocking represents a critical operational state which can adversely affect the working life of the engine. The so-called anti-knock control is a well known method which, on sensing knocking in a cylinder of an internal combustion engine, retards the ignition angle. Knocking can be eliminated in this way. After a certain period of time has elapsed, the ignition angle is reset in the direction of "advance". For preference, this resetting is undertaken in steps, i.e. in retardation, the ignition angle is moved by a relatively large step which, on resetting, is reduced by relatively small equispaced steps, until knocking reoccurs or a preset value of the ignition angle is reached without any occurrence of knocking. An adaptation characteristic diagram is also envisaged which, depending on the size of the operating parameters of the engine, has subdivided ranges. In each range, the value of an ignition angle retardation which was determined in this range during operation, is stored on leaving this range (this can also be the value of the ignition angle of retardation which obtains on leaving the range). If the range is changed, i.e. if a new range is entered, then the operational control starts with the value of the ignition retardation angle, which is stored there when this range is entered. If this proves to be too great for the prevailing operating condition, i.e. if it is retarded too far, then it is reset in accordance with the anti-knock control algorithm.

SUMMARY OF THE INVENTION

Accordingly, it is an object of the present invention to provide process for controlling the knocking in an internal combustion engine, which avoids the disadvantages of the prior art.

In keeping with these objects and with others which will become apparent hereinafter, one feature of the present invention resides, briefly stated, in the process of controlling the knocking of an internal combustion engine, including retarding the ignition angle when a cylinder knocks; resetting the ignition angle by adjustment in the direction of "advance"; storing prevailing ignition angle retardation values in an adaptation characteristic diagram, which depending on the size of operating parameters of the internal combustion engine, has subdivided ranges, with one value of an ignition angle retardation, determined during operation in the appropriate range, in particular on leaving this range, always being stored; setting of the value of the ignition angle retardation as stored for a particular range, on changing into this range, wherein in accordance with the present invention on changing the range the resetting of the ignition angle takes place with increased advance adjustment speed until knocking occurs in this range or until a predetermined value of the ignition angle is reached.

When the process for controlling the knocking is performed in accordance with the present invention, it has the advantage that on changing ranges of the adaptation characteristic diagram, the optimum ignition angle for the prevailing operating condition is rapidly adopted. Starting from the ignition retardation angle stored in each case, the operating condition is rapidly approached to the prevailing knock threshold. When this has taken place, anti-knock control follows the usual course, i.e. if knocking occurs in the new range, then initially, a retardation of ignition will again be made, followed by resetting of the ignition angle in the direction of "advance", which, however, does not take place with increased resetting speed. By comparison with known systems, the procedure in accordance with this invention leads to improved performance, which is particularly noticeable in urban traffic.

In accordance with a further development of the invention, it is envisaged that—as already mentioned—a step-wise advance or retardation adjustment of the ingnition takes place.

In particular, in order to achieve increased advance adjustment speed, it is possible to reduce the width of the consecutive steps during the resetting of the ignition angle in the direction of "advance". Additionally or alternatively, it is also possible to permit a larger advance adjustment step vis-a-vis the operation, if resetting of the ignition angle takes place without changing the range.

A reduced width of step can, in particular, be set via a programmable factor. This allows individual adaptation to a particular engine.

For preference, anti-knock control is effected by a control device of the internal combustion engine. It is advantageous if, on adopting a new range, a control bit (flag) is set in a control device circuit, this flag triggering the increased advance adjustment speed in its setting condition. If knocking occurs in the newly adopted range, then the flag is set back and operation is continued with normal step width.

Preferably employed as operating parameters are load, in particular the manifold pressure, or the air mass, or the throttle valve angle position, and the engine speed.

To this extent, a load and a speed section are allocated to each range of the adaptation characteristic diagram. The load and speed sections can be separated from each other by load and speed thresholds. In particular, the adaptation characteristic diagram is constructed as a cartesian coordinate system, i.e. for example the load is plotted on the ordinate and the engine speed is plotted on the abscissa. Consequently the load and speed sections are obtained on the ordinate and abscissa. If a load threshold and/or a speed threshold is exceeded, then a change of range takes place in the characteristic diagram.

As already mentioned, after the first occurrence of knocking, the ignition angle is advanced in each range, i.e. the displacement from the retard position in the direction of "advance" is undertaken with normal, i.e. not increased, advance adjustment speed.

Preferably, the step width can be defined by a counting interval of a step width counter. In order to bring about the increased advance adjustment speed, the starting value and/or the final value of the counter count can be altered in such a way that the counting interval is shortened. In single-step ignition angle retardation—previously mentioned—the step height is larger than in ignition angle resetting. Consequently the retardation range is reduced step-wise until knocking reoccurs or—if no knocking occurs—on reaching a preset value of the ignition angle. Thus whenever the counting interval final value is reached, an ignition angle advance adjustment takes place by an incremental amount corresponding to the step height.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Description of the Preferred Embodiments

Figure 1:
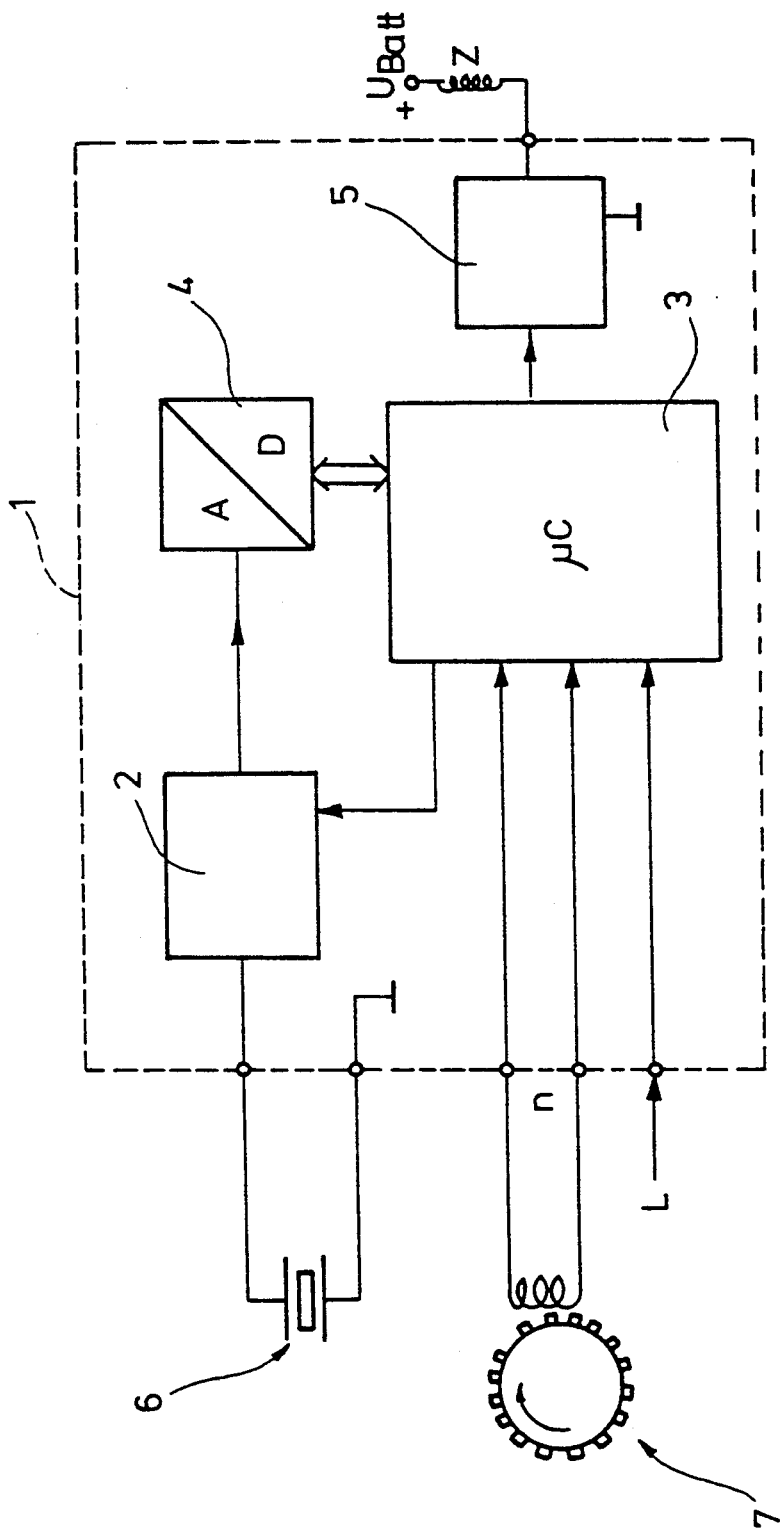
FIG. 1 shows a schematic block diagram for adaptive anti-knock control.

FIG. 1 shows a block diagram for carrying out a procedure of an adaptive anti-knock control of an internal combustion engine. The internal combustion engine is operated with a control device 1, which has a knock sensor evaluation circuit 2, a processor 3 (microcontroller $\mu C$), a digital-analog converter 4, and an ignition final stage (5).

In order to detect knocking in the cylinders of the engine, there are one or several knocking sensors 6 which are connected to the knocking sensor evaluation circuit 2. Furthermore, the engine is equipped with an engine speed sensor 7, which feeds a signal corresponding to the speed n to the microcontroller $\mu C$. Moreover, a further parameter of the engine is fed to the microcontroller $\mu C$, which characterises the load L of the engine. The load L can, for example, be determined from the throttle angle position or the manifold pressure.

The knock sensor evaluation circuit 2 is connected via the digital-analog converter 4 with the processor 3. An output of the processor 3 leads to the ignition final stage 5, which operates an ignition coil Z assigned to it. One connection of the ignition coil Z is connected with the positive terminal of the battery $U_{BATT}$.

Figure 2:
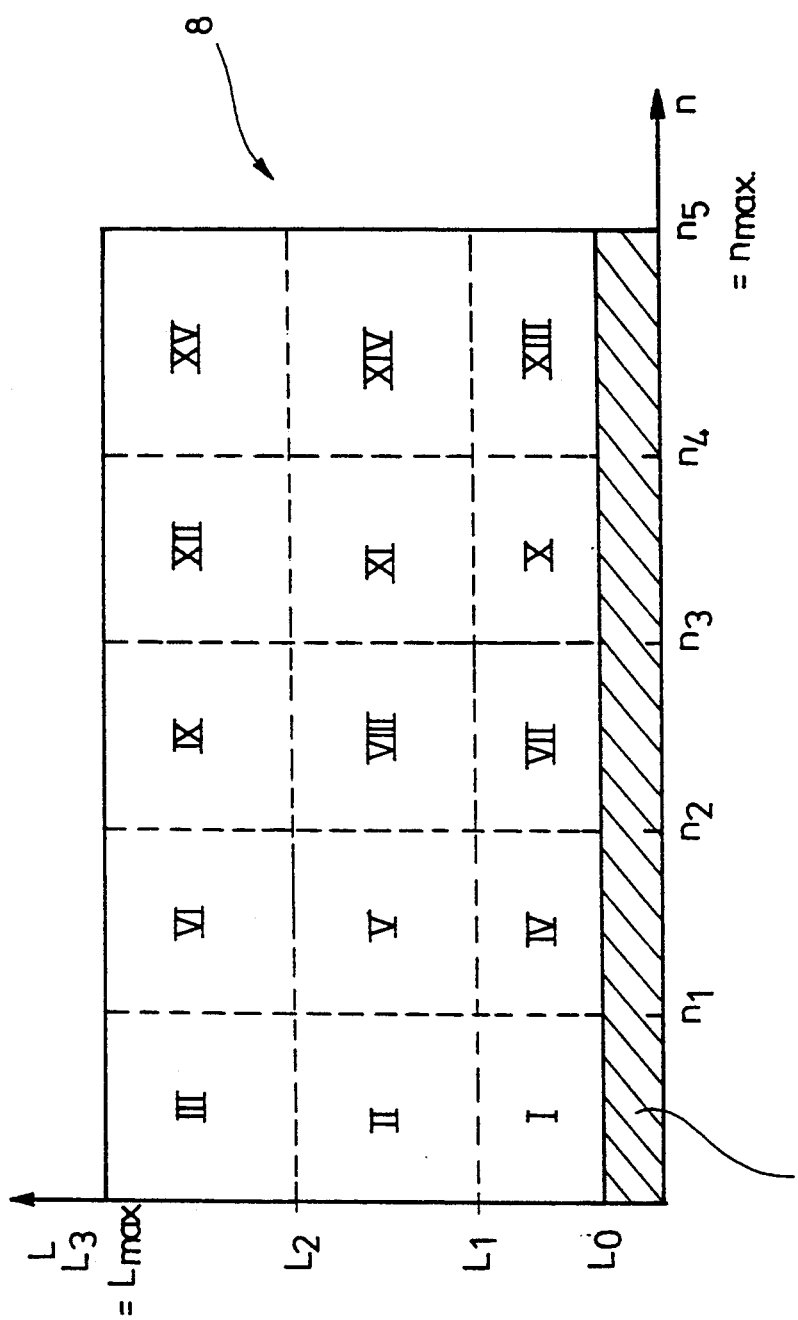
FIG. 2 shows an adaptation characteristic diagram.

In order to carry out adaptive anti-knock control, the microcontroller $\mu C$ has an adaptation characteristic diagram 8. This is represented in FIG. 2. The adaptation characteristic diagram 8 is subdivided into ranges, e.g. I to XV. The number of ranges—depending on the design form—can be predetermined, or more particularly, programmed. The load L is plotted on the ordinate of the diagram in FIG. 2, the speed n is plotted on the abscissa. Through load thresholds $L_0$, $L_1$, $L_2$ and $L_3$, load sections are formed on the ordinate, and through speed thresholds $n_1$, $n_2$, $n_3$, $n_4$ and $n_5$, speed sections are formed on the abscissa. Each load section defines, with a corresponding speed section, one particular range of the ranges I to XV. The load threshold $L_0$ corresponds to a minimal load; the load threshold $L_3$ represents a maximum load of the internal combustion engine. Similarly for the speed, the speed threshold $L_1$ is a minimal speed, whilst the speed threshold $L_5$ characterises the maximum speed of the engine. For loads smaller than the minimal load $L_0$, a range 9 is provided, in which the anti-knock control is not active. The load thresholds $L_0$ to $L_3$ can be designed in such a way that they are present as a characteristic curve over the speed.

Figure 3:
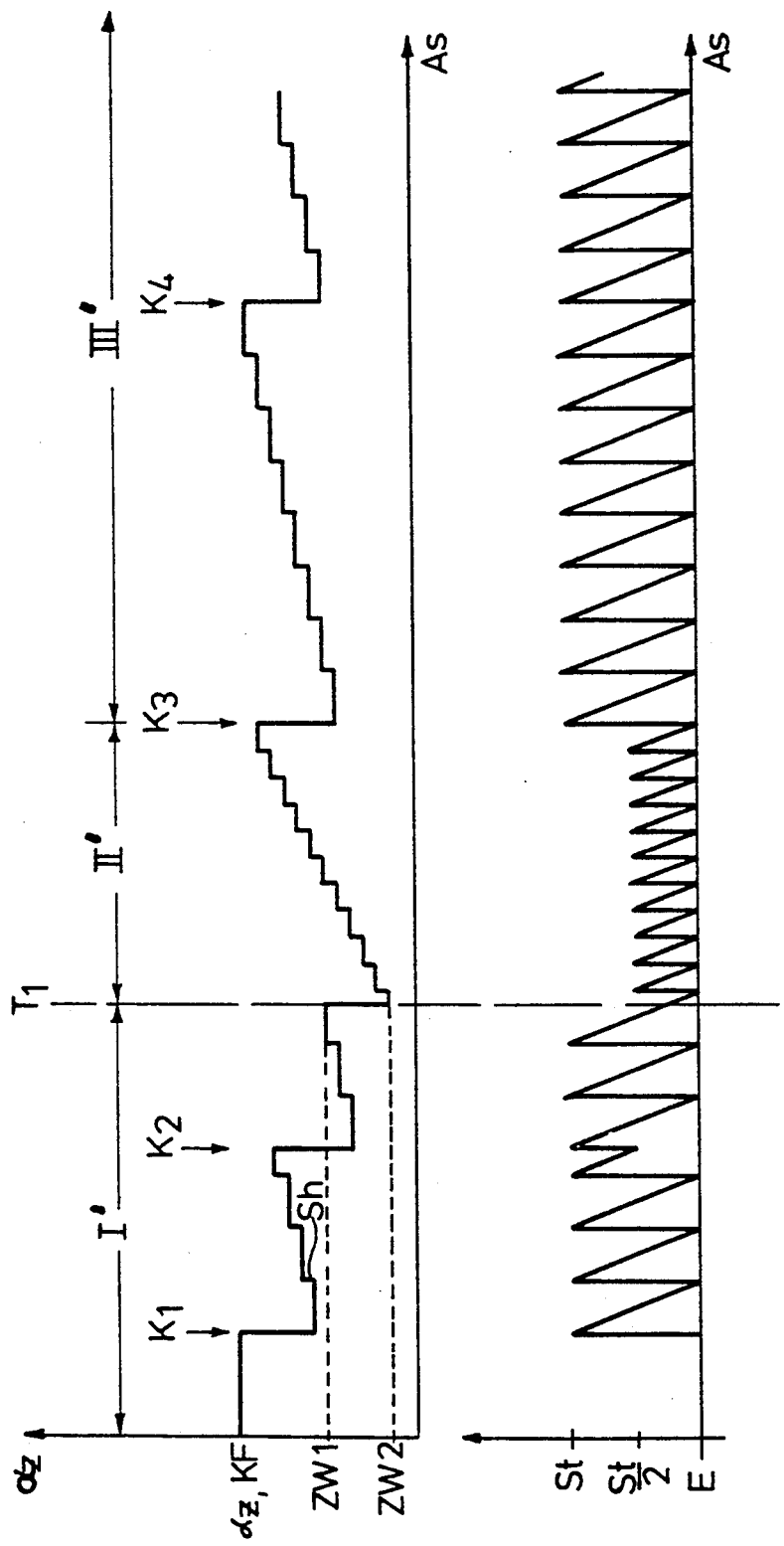
FIG. 3 shows diagrams of the ignition angle adjustment sequence and signals of a step width counter.

The principle of adaptive anti-knock control shall now be explained in more detail on the basis of FIG. 3:

For implementing the procedure for adaptive anti-knock control let it be assumed that the knock sensor 6 of a cylinder of the internal combustion engine detects knocking. In the upper diagram of FIG. 3, in which the ignition angle $\alpha_z$ is plotted over the parameter "working cycles" As, the occurrence of knocking is characterised by "K1". Until the commencement of knocking, the corresponding cylinder of the engine is operated with the ignition angle $\alpha_{z,\,KF}$. This should be an optimum characteristic diagram ignition angle for operation with high octane fuel. With the occurrence of a knocking combustion (K1), the ignition angle $\alpha_z$ is adjusted in the direction of "retard". When a step width counter of the processor 3, which adopts its starting value for example synchronised with the occurrence of a knocking combustion (but which can also run unsynchronised), reaches its final value E by counting down, the ignition angle is reset in the direction of "advance". This takes place step-wise in such a way that the step height Sh, on resetting the ignition angle $\alpha_z$, is smaller than the amount of the single step in the retardation of the ignition angle $\alpha_z$. The step height Sh, on resetting the ignition angle $\alpha_z$, thus corresponds to only one incremental amount. When the final value E of the step width counter is reached, this has the effect that the step width counter again assumes its starting value St, and again counts down to its final value E. Consequently the actual ignition angle $\alpha_z$ approaches its original value again in a step-wise manner. If knocking recurs (K2), then a retardation adjustment of the ignition angle $\alpha_z$ is again made. This process is repeated, so long as the operating point of the internal combustion engine remains within the state characterised by I'.

At time T1, a change of range occurs, i.e. a range I to XV of the adaptation characteristic diagram 8 is vacated, and a new range I to XV is adopted (e.g. a change from range X to XI can take place). This has the effect that the ignition angle retardation value determined during operation in this range is stored, for example the applicable ignition angle retardation value ZW1 which pertains on leaving range X, stored in range X of the adaptation characteristic diagram 8. At the same time, the ignition angle retardation value ZW2, stored by the previous operation in range XI, is output and adopted for the operation of the corresponding cylinder of the engine.

According to the invention, through the change of range—starting from the stored ignition angle retardation value ZW2—a resetting of the ignition angle $\alpha_z$ in the direction of "advance" takes place with increased advance adjustment speed. This is realised by the fact that the step width counter starts not at a starting value St, but at a smaller starting value (e.g. St/2). The reduced start value can, for example, be specified via a programmable factor (devisor). Consequently the step width of the step-wise ignition angle resetting is shortened, so that the increased advance adjustment speed mentioned above occurs. The internal combustion engine is now operated in the state marked II' in FIG. 3. If renewed knocking (K3) occurs, then in turn the ignition angle $\alpha_z$ is adjusted in the direction of "retard", and subsequently reset (condition III') in accordance with the usual advance adjustment algorithm, i.e. not with the increased advance adjustment speed. If knocking occurs again (K4), then the operation just described is continued (without increased adjustment speed).

The procedure in accordance with the invention has the advantage that due to the powerful dynamics, in the case of a change of range of the adaptation characteristic diagram 8, the optimum value for the respective operating condition is rapidly adopted by the engine. This becomes very noticeable through improved performance, particularly in urban traffic.

The load-speed thresholds $L_0$, $L_1$, $L_2$, $L_3$; $n_1$, $n_2$, $n_3$, $n_4$ and $n_5$ should preferably be set by programming.

It will be understood that each of the elements described above, or two or more together, may also find a useful application in other types of constructions differing from the types described above.

While the invention has been illustrated and described as embodied in a procedure for control of knocking in internal combustion engines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process for controlling knocking of an internal combustion engine, comprising the steps of retarding an ignition angle when a cylinder knocks; resetting the ignition angle by adjusting in the direction of advance; storing prevailing ignition angle retardation values in an adaptation characteristic diagram which, depending on a size of operating parameters of the internal combustion engine, has subdivided ranges, with one value of an ignition angle retardation determined during operation in an appropriate range and particularly on leaving this range, always being stored; setting the valve of the ignition angle retardation as stored for a particular range on changing into this range; and on changing the range, resetting the ignition angle with increased advance adjustment speed until knocking occurs in this range or until a predetermined value of the ignition angle is reached.

2. A process as defined in claim 1; and further comprising performing one of the ignition angle retardation and the ignition angle advancement in a step-wise fashion.

3. A process as defined in claim 2, wherein said performing includes reducing a step width to achieve an increased advance adjustment speed.

4. A process as defined in claim 3, wherein said reducing of the step width includes setting a reduced step via a programmable factor.

5. A process as defined in claim 2; and further comprising enlarging a size of an advancement adjustment step in order to achieve an increased advance adjustment speed.

6. A process as defined in claim 1; and further comprising the step of setting in a control device circuit a flag on entering a new range, so that this flag in its set state triggers an increased advance adjustment speed.

7. A process as defined in claim 1; and further comprising the step of selecting an operating parameter to be a load.

8. A process as defined in claim 7, wherein the operating parameter is a manifold pressure.

9. A process as defined in claim 1; and further comprising the step of selecting an operating parameter to be an air mass.

10. A process as defined in claim 1; and further comprising the step of selecting an operating parameter to be a throttle angle.

11. A process as defined in claim 1; and further comprising the step of selecting an operating parameter to be a speed of the internal combustion engine.

12. A process as defined in claim 7; and further comprising the step of assigning a load section to each range of the adaptation characteristic diagram.

13. A process as defined in claim 11; and further comprising the step of assigning a speed section to each range of the adaptation characteristic diagram.

14. A process as defined in claim 12; and further comprising the step of separating the load sections from one another by load thresholds.

15. A process as defined in claim 13; and further comprising the step of separating the speed sections from one another by speed thresholds.

16. A process as defined in claim 1; and further comprising the step of performing the ignition angle advance adjustment in each range after first occurrence of knocking, with a normal and not increased advance adjustment speed.

17. A process as defined in claim 2; and further comprising the step of defining a step width by a counting interval of a step width counter; and bringing about an increased advance adjustment speed by altering one of a starting value and a final value of a counter count in such a way that a counting interval is reduced.

18. A process as defined in claim 2; and further comprising the step of bridging a size of a step in ignition angle retardation larger than in ignition angle advance adjustment.

19. A process as defined in claim 18, wherein the ignition angle retardation is a single-step ignition angle retardation.

20. A process as defined in claim 2; and further comprising the step of performing an ignition angle advance adjustment, on reaching a counting interval final value, by an incremental amount corresponding to a step size.

* * * * *